(12) United States Patent
Signaroldi et al.

(10) Patent No.: US 12,037,864 B2
(45) Date of Patent: Jul. 16, 2024

(54) SMART SUBSEA CONTROL MODULE

(71) Applicants: ENI S.P.A., Rome (IT); BREDA ENERGIA S.P.A., Milan (IT)

(72) Inventors: Fabio Signaroldi, San Donato Milanese (IT); Maurizio Fumagalli, San Donato Milanese (IT); Stefano Magi, San Donato Milanese (IT); Marco Pasini, Sesto San Giovanni (IT)

(73) Assignee: ENI S.P.A., Rome (IT)

( * ) Notice: Subject to any disclaimer, the term of this patent is extended or adjusted under 35 U.S.C. 154(b) by 12 days.

(21) Appl. No.: 17/601,486

(22) PCT Filed: Apr. 3, 2020

(86) PCT No.: PCT/IB2020/053217
§ 371 (c)(1),
(2) Date: Oct. 5, 2021

(87) PCT Pub. No.: WO2020/202104
PCT Pub. Date: Oct. 8, 2020

(65) Prior Publication Data
US 2022/0162923 A1    May 26, 2022

(30) Foreign Application Priority Data
Apr. 5, 2019   (IT) .................. 102019000005244

(51) Int. Cl.
*E21B 33/03*    (2006.01)
*E21B 33/035*   (2006.01)
*G05D 16/00*    (2006.01)

(52) U.S. Cl.
CPC ....... *E21B 33/0355* (2013.01); *G05D 16/028* (2019.01)

(58) Field of Classification Search
CPC .......................... E21B 33/0355; G05D 16/028
See application file for complete search history.

(56) References Cited

U.S. PATENT DOCUMENTS

| | | |
|---|---|---|
| 2011/0144946 A1 | 6/2011 | Flanders |
| 2012/0152559 A1* | 6/2012 | Knox .................. E21B 41/0007 166/345 |
| 2017/0362909 A1* | 12/2017 | Elliott .................. E21B 33/037 |
| 2018/0274319 A1 | 9/2018 | Lycke et al. |

FOREIGN PATENT DOCUMENTS

| | | |
|---|---|---|
| GB | 1110309 A | 4/1968 |
| WO | 2017218457 A1 | 12/2017 |

OTHER PUBLICATIONS

International Search Report dated Aug. 5, 2020 for PCT Appl. No. PCT/IB2020/053217.

(Continued)

*Primary Examiner* — Paul J Gray
(74) *Attorney, Agent, or Firm* — Ruggiero McAllister & McMahon LLC (57) ABSTRACT

The present invention relates to a smart subsea control module for controlling subsea equipment independent of equipment located above the surface of the sea, and particularly for independently managing control and safety strategies according to a programmed logic.

2 Claims, 6 Drawing Sheets

(56) References Cited

OTHER PUBLICATIONS

Written Opinion dated Aug. 5, 2020 for PCT Appl. No. PCT/IB2020/053217.
International Preliminary Report on Patentability (IPRP) dated Aug. 5, 2020 for PCT Appl. No. PCT/IB2020/053217.
International Standard, Functional safety of electrical/electonic/programmable electronic safety-related systems—Part 7: Overview of techniques and measures (see Functional Safety and IEC 61508, IEC 61508-7:2010; 4 pages;—Apr. 30, 2010 for IEC 61508 Parts 1-7:2010 (see https://webstore.iec.ch/publication/5521).
International Standard, Functional safety—Safety instrumented systems for the process industry sector—Part 1: Framework, definitions, system, hardware and application programming requirements, IEC 61511-1:2016+AMD1:2017 CSV, 4 pages; Aug. 16, 2017 for IEC 61511-1:2016+Corr.1:2016+AMD1:2017 (see https://webstore.iec.ch/publication/61289).

* cited by examiner

SMART SUBSEA CONTROL MODULE

CROSS-REFERENCE TO RELATED APPLICATIONS

This patent application claims priority under 35 U.S.C. § 119(a) to Italian Patent Application No. 102019000005244 filed on Apr. 5, 2019, and is a national stage application under 35 U.S.C. § 371, of PCT/IB2020/053217 filed on Apr. 3, 2020 the entire content all of which is incorporated by reference herein in their entirety.

BACKGROUND OF THE DISCLOSURE

1. Field of the Disclosure

The present invention relates to a smart subsea control module for controlling subsea equipment independent of equipment located above the surface of the sea, and particularly for independently managing control and safety strategies according to a programmed logic.

2. Description of the Related Art

In offshore oil and gas operations, there is a variety of equipment located at the seabed which has to be controlled and operated safely. With any subsea well there is typically a Christmas tree (an assembly of valves, spools, and fittings which is used to regulate the flow of fluids in or out of the well) and manifolds (flow routing devices). There may also be other subsea equipment such as oil and gas separation systems, pumping systems or compression systems.

Typically, there are control and safety system architectures which consist of two separate units: one located on the seabed and the other located at or above the surface. The equipment unit located at the seabed which controls the valves of the Christmas tree or manifold is typically referred to as a subsea control module, whilst the equipment unit which is located at the surface is typically referred to as the master control station. It is common to have one master control station which liaises with several subsea control modules located at wells spread out across the seabed.

Typically, each subsea control module acquires data from the instruments which it controls, such as a Christmas tree or valves of a manifold, and organises and transmits this data to the master control station. When the subsea control module receives commands from the master control station, such as to open or close a valve, it will carry out these commands. The master control station sends commands to the subsea control modules to gather data and to send this data to the master control station, which is able to receive and process said data through the execution of control logics pre-programmed into the master control station. The master control station can then send another command to the subsea control module based on the outcome of the control logic, for example to open or close a valve or acquire more data.

Typically, there are two electro-hydraulic connections between the master control station/hydraulic pressure unit and the subsea control module. Umbilicals typically make a connection between the master control station/hydraulic pressure unit and a subsea termination unit or subsea distribution unit and then hydraulic flying leads and electrical or electrical and optical flying leads connect the subsea termination unit or subsea distribution unit to each subsea control module. Alternatively, there can be one flying lead which comprises both hydraulic fluid line(s) and electrical cable(s) or optical fibres(s). In any case, hydraulic communication is required between a hydraulic control unit located within, or as a standalone unit associated with, the master control station on the surface, and an electrical or electrical and optical connection is required between the master control station on the surface and the subsea control module on the seabed. The hydraulic control unit comprises a pressurisation system, wherein the hydraulic connection to the subsea control module can be pressurised such that the subsea control module has high pressure hydraulic fluid available to operate valves and perform other functions on the equipment located at the seabed. The electrical, or electrical and optical connection provides power to the subsea control module so that it can operate. Chinese Patent document CN106020102A describes an intelligent control system for a subsea Christmas tree and its control method. The intelligent control system includes a main surface control station, umbilical cable, subsea control module and subsea Christmas tree. The data of the subsea Christmas tree is monitored through a sensor installed in the subsea tree. The surface control system extracts and analyses the monitored data, monitors the data in real time and sends the corresponding control instructions to the subsea control module through the umbilical cable to subsequently inspect the subsea control module to complete the control functions.

U.S. Pat. No. 9,181,942 B2 describes a control and instrumentation system using a subsea data hub to stabilise a closed circuit between the components of the subsea production system and a controller positioned on the surface. The control and instrumentation system can be used for operational control of all the process components required from the subsea production system by the surface controller. The subsea production system includes a plurality of pumps deployed subsea and a data hub distributed subsea. The surface controller is operationally linked to the plurality of pumps through the subsea data centre to inspect the functioning of the plurality of pumps.

WO 2017/218457 A1 describes a high-integrity pressure protection system (HIPPS). Typically, a HIPPS system includes a subsea Christmas tree, a choke valve and a high-integrity pressure protection system. The high-integrity pressure protection system includes three pressure sensors downstream of the choke valve in 2003 logic, the master valve and the wing valve located upstream of the choke and a dedicated logic solver used to control the valves of the HIPPS located upstream of the choke valve. The HIPPS conforms to the IEC 61508 and 61511 standard and is SIL 3 or SIL 4 certified.

Other known solutions are disclosed in the document US 2011/0144946 A1 relates to a method for diagnostics of a high integrity protection system HIPS and in the document GB110309 A relates to a remote treatment of wells.

The conventional system described above has reliability issues and does not represent an ideal configuration, as it will be understood that operations on the seabed requiring high pressure hydraulic fluid are dependent on the high pressure hydraulic fluid line from the surface (umbilical and flying leads). As such, when the line it depressurised, it is the entire line which must be depressurised. In deepwater operations, the hydraulic line may be several thousand meters long, and it may take a long time to pressurise the entire line from the surface during the initial charging phase, leading to the unavailability of control of the subsea equipment while the line is still pressurising. Furthermore, the prior art systems cannot react quickly and depressurise only short sections of hydraulic line to quickly put the valves to fail-safe positions.

Furthermore the prior art systems are unreliable as the control functions are divided into two separate units, the Master Control System and the Subsea Control Module, which are located in two different places.

Currently market available systems dedicated to process control comprise two units, one located subsea which is devoted to data collection and execution of commands, and one located topside which is the main logic control unit responsible for the elaboration of data collected from the subsea unit and for the transmission of commands to such subsea unit based on pre-programmed logics. State of the art systems, when management of safety controls is implemented, rely upon an additional third unit separate from the others as for example HIPPS.

Traditional systems are generally badly affected by the communication physical connection or harness cable since it could be a source of faults that renders the subsea system unable to perform control actions.

One of the achievements of the smart Subsea Control Module (SCM) as for the instant invention is that process and safety controls and actuations are independent from topside pressure venting to provide safety actions, and the SCM is capable of performing SIL function in a very short time being it located near the pressure source (for example a subsea well). The SCM of the invention doesn't rely on a topside system to perform safety actions and it is capable of maintaining a complete control capability. Loss of communication with the topside system does not compromise the capacity of the SCM to perform control and safety tasks.

State of the art HIPPS is a safety system independent from topside but it is not capable of performing or implementing any control strategy even if provided with a logic controller and is only able to perform this safety function. Hence, a traditional HIPPS cannot autonomously govern process and safety tasks but it needs constant communication with a topside unit for evaluation and decision making to be implemented.

SUMMARY OF THE INVENTION

According to a first aspect of the invention, there is provided a subsea control module (SCM), comprising:
   a first subsea electronics module (SEM) comprising a first central processing unit (CPU), a first input means and a first output means, wherein
   the first input means is configured to receive an incoming data signal from at least one sensor and transmit the incoming data signal to the first CPU;
   the first CPU is configured to receive the incoming data signal from the at least one sensor, apply pre-programmed logic to the said incoming data signal and send an outgoing data signal to the first output means; and
   the first output means is configured to receive the outgoing data signal from the first CPU and send the outgoing data signal to a dump valve.

This arrangement provides a subsea control module which is capable of operating dump valves positioned within the subsea control module, so that pressures can be released based on the sensed parameters or a command, without the need to send these signals to the surface for processing. These fail closed shutdown valves trip into a fail position (closed) upon the release of pressure. The installation of these valves on the equipment allows for safe isolation. The SCM is provided with two separate hydraulic lines which manage two different level of pressure (HP for downhole equipment and LP for subsea equipment). Each of those lines is equipped with a dump valve.

Additionally, the subsea control module may comprise:
   a second redundant SEM, acting independently from and simultaneously with the first SEM, comprising a second CPU, a second input means and a second output means, wherein
   the second input means is configured to receive the incoming data signal from at least one sensor and transmit the incoming data signal to the second CPU,
   the second CPU is configured to receive the incoming data signal from the at least one sensor, apply pre-programmed logic to the incoming data signal and send an outgoing data signal to the second output means,
   the second output means is configured to receive the outgoing data signal from the second CPU and send the outgoing data signal to a first dump valve or a second dump valve.

According to a preferred embodiment of the present invention there is provided a subsea control module (SCM), comprising:
   a first subsea electronics module (SEM) comprising a first central processing unit (CPU), a first input means and a first output means, the first CPU and the first input means and the first output means being SIL3 certified according to IEC 61508 (IEC 61508 Parts 1-7:2010 published on 30 Apr. 2010) and IEC 61511 (IEC 61511-1:2016+Corr.1:2016+AMD1:2017 published on 16 Aug. 2017), wherein the first input means is configured to receive an incoming data signal from at least one sensor and transmit the incoming data signal to the first CPU;
   the first CPU is configured to receive the incoming data signal from the at least one sensor, apply pre-programmed logic to the said incoming data signal and send an outgoing data signal to the first output means; and the first output means is configured to receive the outgoing data signal from the first CPU and send the outgoing data signal to a dump valve;
   a second redundant subsea electronic module (SEM), acting independently from and simultaneously with the first SEM, comprising a second CPU, a second input means and a second output means, the second CPU and the second input means and the second output means being SIL3 certified according to IEC 61508 and IEC 61511, wherein the second input means is configured to receive the incoming data signal from at least one sensor and transmit the incoming data signal to the second CPU;
   the second CPU is configured to receive the incoming data signal from the at least one sensor, apply pre-programmed logic to the incoming data signal and send an outgoing data signal to the second output means,
   the second output means is configured to receive the outgoing data signal from the second CPU and send the outgoing data signal to a dump valve
   and certified electronics enabling communication from and to the subsea control module through a SIL3 certified communication protocol according to IEC 61508 and IEC 61511;
   the subsea control module being SIL3 certified according to IEC 61508 and IEC 61511.

According to a further aspect of the present invention, there is provided a subsea control system (SCS) for positioning subsea and operating subsea valves and equipment, the SCS comprising:

the SCM in accordance with the first aspect of the invention further comprising a dump valve for releasing pressure in a hydraulic actuation line;

and a hydraulic accumulator positioned upstream or downstream of the dump valve, wherein the dump valve is in data communication with the SEM.

More preferably the first dump valve is for releasing pressure in a first hydraulic actuation line, the first dump valve being positioned downstream of a first hydraulic accumulator, and arranged in data communication with the SEM and, a second dump valve for releasing pressure in a second hydraulic actuation line, the second dump valve being positioned upstream of a second hydraulic accumulator, and arranged in data communication with the SEM wherein, the output means is configured to send the outgoing data signal to the first dump valve or the second dump valve.

Additionally, the subsea control system may comprise:
a low pressure hydraulic line upstream of and fluidly connected to the first dump valve;
a high pressure hydraulic line upstream of and fluidly connected to the second dump valve;
a first hydraulic accumulator positioned upstream of the first dump valve;
a second hydraulic accumulator positioned downstream of and fluidly connected to the second dump valve;
a first hydraulic actuation line fluidly connecting the first dump valve to a control valve; and
a second hydraulic actuation line fluidly connecting the second hydraulic accumulator to a subsea safety valve.

Additionally, the subsea control module may comprise:
a second redundant SEM, acting independently from and simultaneously with the first SEM, comprising a second CPU, a second input means and a second output means, wherein
the second input means is configured to receive the incoming data signal from at least one sensor and transmit the incoming data signal to the second CPU,
the second CPU is configured to receive the incoming data signal from the at least one sensor, apply pre-programmed logic to the incoming data signal and send an outgoing data signal to the second output means,
the second output means is configured to receive the outgoing data signal from the second CPU and send the outgoing data signal to a first dump valve or a second dump valve.

Additionally, the SCM may further comprise a third dump valve, configured in series with the first dump valve and in fluid communication with the first hydraulic actuation line and in data communication with the first output means and second output means, to provide redundancy for the first dump valve.

The valves are positioned in series as opposed to parallel because, if they were in parallel, a stuck open valve would prevent discharging of the fluid. It is sufficient that one valve is operated to discharge the pressurised fluid.

Additionally, the SCM may further comprise a fourth dump valve, configured in series with the second dump valve and in fluid communication with the second hydraulic actuation line and in data communication with the first output means and second output means, to provide redundancy for the second dump valve.

Additionally, the first and second input means may be configured to receive incoming data signals from a plurality of sensors, and further the CPU may be programmed to apply logic to said incoming data signals from the plurality of sensors.

Additionally, the first, second, third and fourth dump valves may be configured to release pressure downstream upon command to move to a release position, and allow flow from upstream to downstream upon a command to move to a refill position. When pressure is released, the fail-closed safety valves on the equipment trip to a fail closed position. When the dump valves are in the refill position the fail-closed safety valves on the equipment can be operated into the open or closed positions.

Additionally, the SCS may further comprise:
at least one additional dump valve positioned on the low pressure hydraulic line and provided with an additional hydraulic actuation line to a hydraulically actuated process valve, the additional dump valve is configured to be operated either by internal logic processing, or by a signal sent from the surface to the SCM, without the subsea control module applying logic to the signal, the additional dump valve being configured to release pressure downstream when commanded into a release position, and to refill the additional hydraulic actuation line when commanded into a refill position.

Additionally, the subsea system may further comprise:
a directional control valve positioned on the low pressure hydraulic line and provided with a further hydraulic actuation line fluidly connecting the directional control valve to an additional process valve to be operated, wherein
the directional control valve is configured to be operated to move from a first position to a second position, or a second position to a first position, by a command from the SCM.

Additionally, the first position may allow fluid communication between the low pressure hydraulic line and the hydraulic actuation line, to allow for refilling of the hydraulic actuation line after it has been depressurised.

Additionally, the SCS may include:
at least a second SCM similar to the first one described, each SCM capable of managing control logics and communicate with each other in order to perform field level logics or operations without relying on topside controls.

The use of a safe and certified communication between the SCMs of the SCS allows for the possibility of creating a distributed safety and control system that can react to local danger or can implement actions to cope with dangers located on other points of the network either located subsea or topside. This interaction is both safety-wise and process-wise.

All SCMs of the SCS maintain the characteristics of independency from topside equipment.

In case of a failure in the communications between SCMs comprised in the SCS or between the SCS and topside units, safety control provided by the SCS and SCMs over subsea equipment is not compromised. SCS and its SCMs can operate autonomously thus removing a potential point of failure.

The described system provides a reliable and robust system which can provide for an automated response to particular sensed parameters from the sensors on the subsea equipment. The CPU is able to process the sensed parameters and apply the pre-programmed logic to determine if the dump valves or directional control valve should be activated. The system can perform this function without any intervention from the surface. The use of hydraulic actuation lines between the additional dump valve and the hydraulically actuated valve, and between the directional control valve and the additional control valve, allows for only a short length of hydraulic line to be depressurised when required, and then refilled and repressurised quickly when required.

Furthermore, a great advantage is provided in the positioning of the first and second hydraulic accumulators. The positioning of the first hydraulic accumulator upstream of the first and third dump valves ensures that a high pressure is available to the first hydraulic actuation line to allow for it to be refilled and repressurised quickly after the dump valve has released the high pressure in the first hydraulic actuation line.

Typically the third dump valve is arranged to provide redundancy for the first dump valve, and the fourth dump valve is arranged to provide redundancy for the second dump valve.

The first dump valve, and third dump valve providing redundancy for the first dump valve, control different safety valves than the second (and fourth) dump valves. The first and third dump valves may be arranged to control valves that require instant loss of hydraulic pressure and fast repressurisation, while the second and fourth dump valves may be arranged to control valves that should not lose hydraulic pressure instantly, but instead require a short delay until other valves have been closed to ensure the safety of the system. This can be achieved by using the second and fourth dump valves and the associated configuration of the hydraulic accumulator being positioned downstream.

This configuration ensures that the pressure does not drop instantly at the more safety critical subsea safety valve, which could be an emergency shutdown valve for example. When the dump valve is actuated it will release the high pressure within the second hydraulic actuation line downstream of the dump valve and upstream of the hydraulic accumulator. The hydraulic accumulator will maintain a higher pressure on the downstream side of the hydraulic accumulator for a short period of time, until the hydraulic accumulator can no longer be fed with hydraulic fluid as the pressure upstream of the hydraulic accumulator has been exhausted by the dump valve. Eventually, the pressure downstream of the hydraulic accumulator will also drop, however this delay before the safety critical valve sees a change in hydraulic pressure allows for a period of time for other valves to be closed, which are necessary before the safety critical valves are closed by the drop in hydraulic pressure.

The first and third dump valves used in combination with the redundant SEM with certified electronic and the certified communication with topside or local process pressure detection, allow for SIL 3 certified subsea process valve shutdown. The second and fourth dump valves used in combination with the redundant SEM with certified electronic and the certified communication with topside or local process pressure detection, allow for SIL 3 certified downhole valves shutdown. This arrangement provides SIL 3 certification.

The additional dump valves (at least two) used in combination with the redundant SEM with certified electronic and the local process pressure detection, allow for SIL3 certified HIPPS functionality.

The use of the system as a whole provides one robust system which can operate both safety critical and non-safety critical valves both autonomously and by communication from the surface, and provides for instantaneous activation of valves and delayed activation of valves where required. Furthermore, the hydraulic accumulator positioned upstream of the dump valves allows for faster repressurising of the depressurised lines, saving a great deal of time.

DETAILED DESCRIPTION

Figure 1:
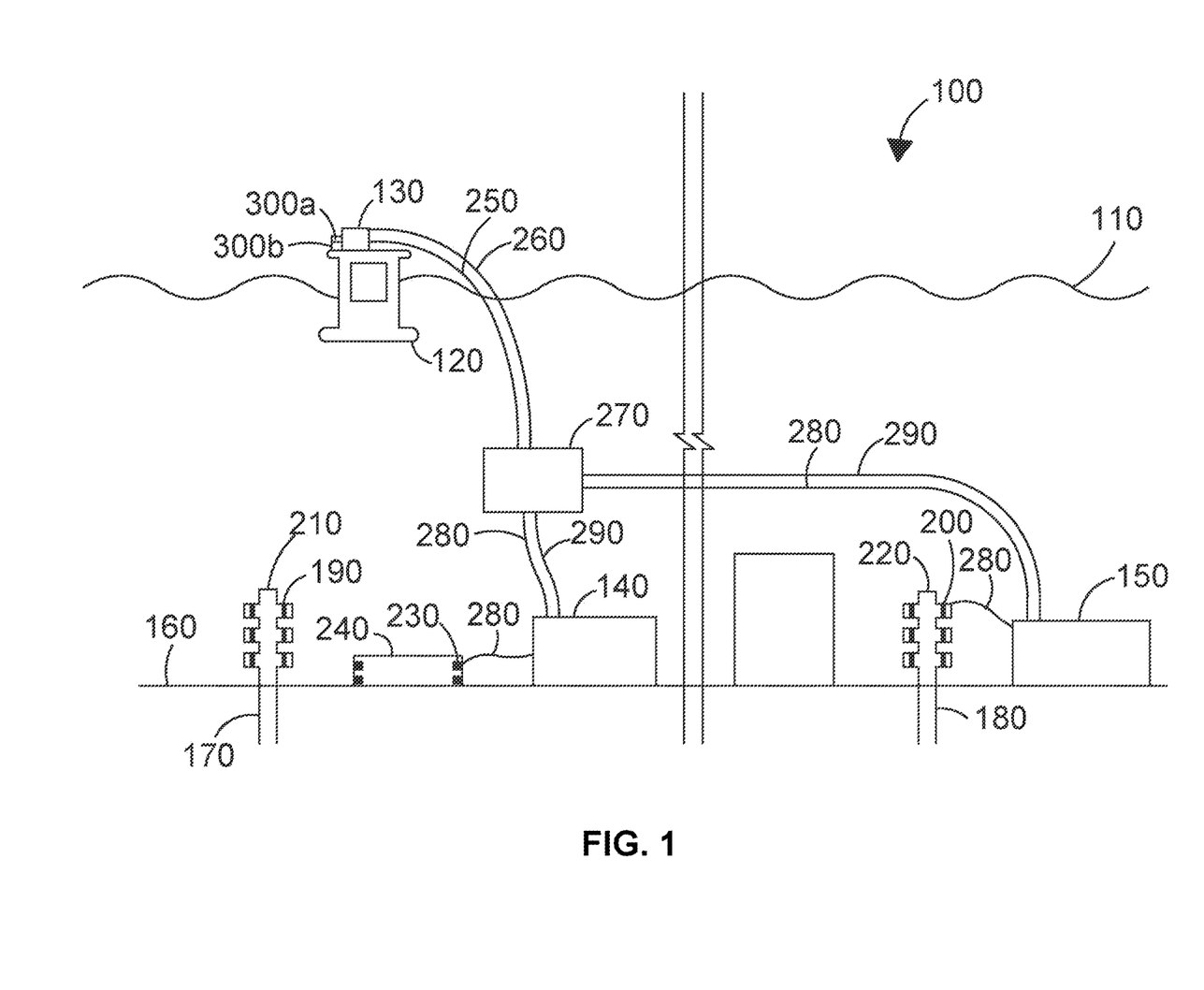
FIG. 1 shows a prior art control and safety system architecture.

Referring now to FIG. 1, which shows an existing prior art control and safety system architecture 100. The control and safety system architecture 100 is split across surface and subsea equipment, positioned above and below sea level 110. Typically there is a surface vessel 120, usually a fixed or floating platform or ship, where a master control station 130 is located. There is also one or more subsea control modules 140, 150 located subsea at a Christmas tree or other subsea structure. It is common to have one master control station 130, which includes an electrical power unit, and which liaises with several subsea control modules 140, 150 located at wells 170, 180 spread out across the seabed 160.

Typically, each subsea control module 140, 150 acquires data from instruments which it controls, such as a valves 190, 200 of a Christmas tree 210, 220 and/or valves 230 of a manifold 240, and organises and transmits this data to the master control station 130. When the subsea control module 140, 150 receives commands from the master control station 130, such as to open or close a valve 190, 200, 230, it will carry out these commands. The master control station 130 sends commands to the subsea control modules 140, 150 to gather data and to send this data to the master control station 130, which is able to receive and process it through the execution of control logics pre-programmed into the master control station 130. The master control station 130 can then send another command to the subsea control module 140, 150 based upon the outcome of the control logic, for example to actuate a valve 190, 200, 230, or acquire more data.

Still referring to FIG. 1, a prior art control and safety system architecture 100 comprises two connections between the master control station 130 and the subsea control modules 140, 150, usually in the form of umbilicals 250 and 260, which make connection to a subsea termination unit 270 located subsea. The umbilicals 250, 260 also connect the electrical power unit, a chemical injection unit and hydraulic power unit through a topside umbilical termination unit (not shown). The umbilicals 250, 260 are identical electro-hydraulic umbilicals that may be built in a single physical object. The subsea termination unit 270 is connected to the respective subsea control modules 140, 150 and ultimately to the equipment to be operated by a hydraulic flying lead 280 and an electrical flying lead 290. Alternatively, here may be provided only one flying lead which comprises both hydraulic fluid line(s) and electrical cable(s). Regardless of the number or type of flying leads 280, 290, a hydraulic control unit 300a and electrical control unit 300b located within, or as a standalone unit with, the master control system 130 are in hydraulic and electrical communication, respectively, with the subsea control modules 140, 150. The hydraulic 300a and electrical 300b control units, shown in more detail in FIG. 2, comprises a pressurisation system 310, wherein the hydraulic umbilical 250 to the subsea termination unit 270 and ultimately to the subsea control modules 140, 150 via flying leads 290, can be pressurised such that the subsea control modules 140, 150 have high pressure hydraulic fluid available to operate valves 190, 200, 230 and perform other functions on the equipment located at the seabed 160. The electrical connection provided by the electrical umbilical 260 provides power from an electrical power unit 320 to the subsea termination unit 270 via electrical flying leads 290 to the subsea control modules 140, 150 so they can operate.

Figure 2:
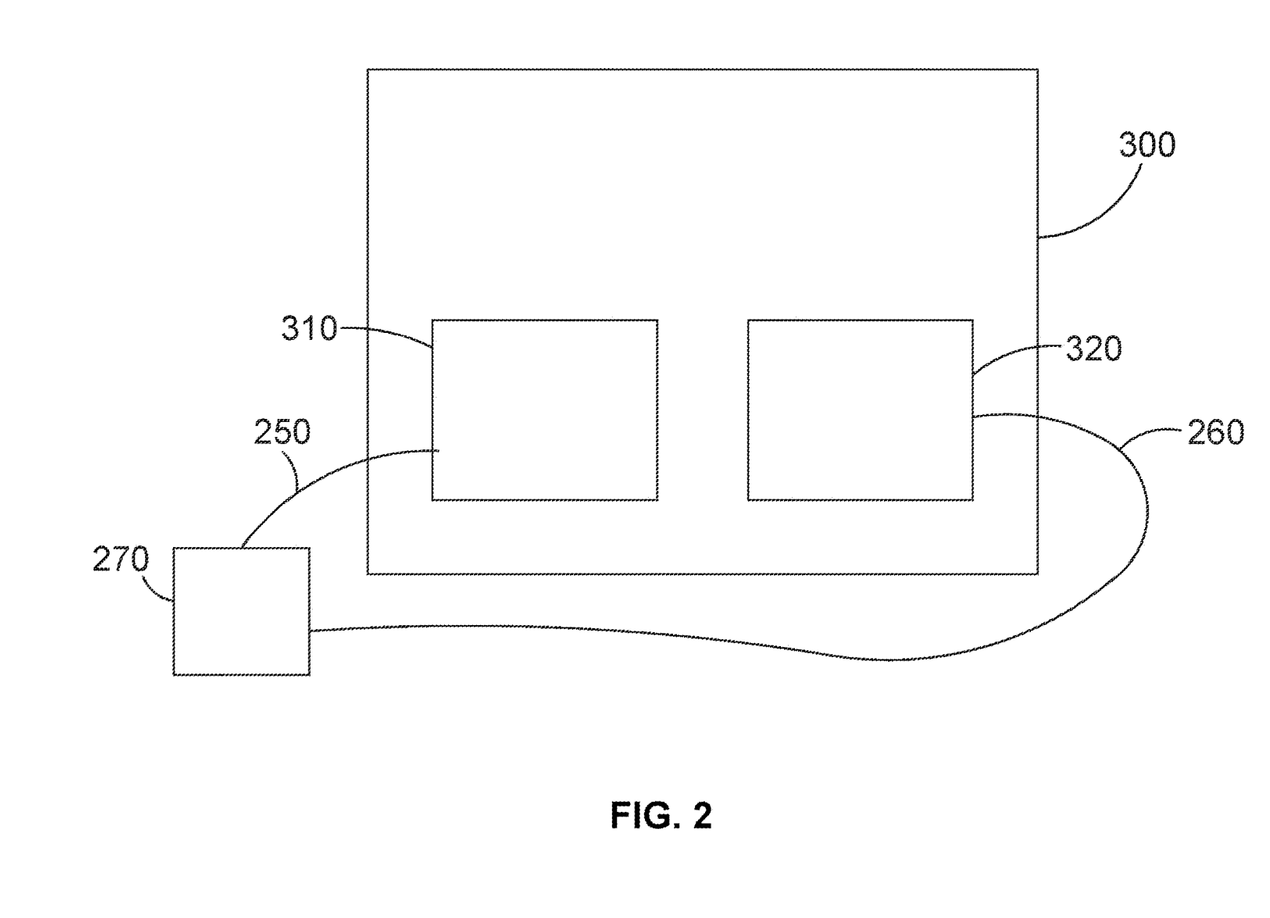
FIG. 2 shows the hydraulic and electrical control unit of the prior art control and safety system architecture of FIG. 1.

Referring still to FIGS. 1 and 2, prior art system 100 operates to control the equipment on the seabed 160 by a series of signals being passed between the master control station 130 and the subsea control modules 140, 150. The hydraulic connection by hydraulic umbilical 250 and hydraulic flying lead 280 allows the entire line between the pressurisation system 310 and the subsea control module 140, 150 to be pressurised to an operating pressure required to open/close valves 190, 200, 230 or operate other subsea equipment. Furthermore, there may be other equipment at the subsea control module 140, 150 to allow for the physical connecting of hoses to the manifold or Christmas tree, and there may also be some intervention by remotely operated vehicles when hoses are moved from one valve to another. The entire hydraulic umbilical 250 and hydraulic flying lead 280 must be rated to the operating pressure, and then pressure must be maintained so that the valves 190, 200, 230 can be operated without delay. If there is some depressurisation of the hydraulic umbilical 250 or hydraulic flying lead 280, it may take some time to re-pressurise these components so that the operating pressure is available.

When controlling critical equipment such as subsea Christmas tress 210, 220, it is desirable to have high pressure hydraulic fluid available at all times ready to activate the valves 190, 200, 230 if necessary. This is critical in ensuring the safety and integrity of the subsea equipment. The subsea control modules 140, 150 gather data on instruction from the master control station 130 and relay this data to the surface for processing at the master control station 130. Once the master control station 130 has applied pre-programmed logic to the data, it makes a decision as to the next steps to be performed at the seabed 160, for example the opening or closing of valves 190, 200, 230. To perform these steps, the hydraulic control unit 300b, which is built to provide storage of pressurised fluid and to keep pressure inside the operative range, must ensure that the hydraulic umbilical 250 and hydraulic flying lead 280 are pressurised, and if they are not, it must pressurise them using the pressurisation system 310. The master control station 130 will then send an electronic command via the electrical umbilical 260 and electrical flying lead 290 to the subsea control module 140, 150 to action whatever command the master control station 130 has determined is necessary.

Figure 3:
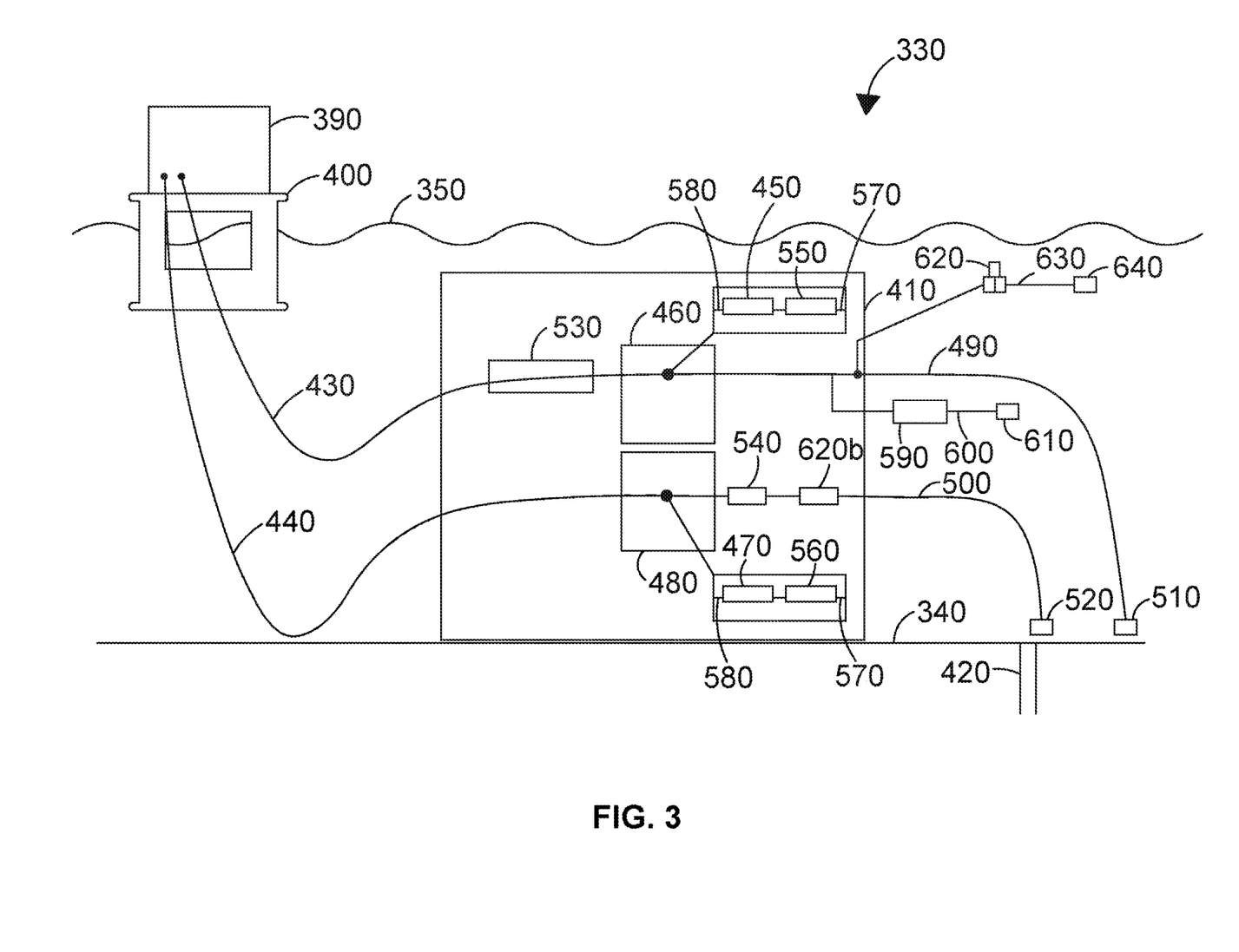
FIG. 3 shows a subsea control system in accordance with an aspect of the present invention.

Referring to FIG. 3 there is shown an example of a subsea control system (SCS) 330 in accordance with an aspect of the present invention comprising a pressure unit 390, which is located at above the surface 350, for example on a vessel 400, and a subsea control modules (SCM) 410 in accordance with an aspect of the invention.

The SCM 410 may be located near to a well 420 and associated equipment with which said SCM 410 interact on the seabed 340. The associated equipment is typically a subsea Christmas tree, subsea manifold or other valve arrangements of this type which are well known in standard subsea architecture. The equipment also includes some downhole valves and equipment which may be required to be operated, particularly emergency shut down valves.

The SCS 330 further comprises a low pressure hydraulic line 430 and a high pressure hydraulic line 440. The low pressure hydraulic line 430 fluidly connects the pressure unit 390 to a first dump valve 450 located within the SCM 410 in a low pressure shutdown node 460. The high pressure hydraulic line 440 fluidly connects the pressure unit 390 to a second dump valve 470 located within the SCM 410 in a high pressure shutdown node 480. The provision of two independent nodes 460, 480 for the low pressure hydraulic line 430 and the high pressure hydraulic line 440 allows for the ability to command different levels of shutdown (e.g. ESD1/ASD via the high pressure shutdown node 480, and ESD2 via low pressure shutdown node 460).

The first dump valve 450 is for releasing pressure in a first hydraulic actuation line 490, and the second dump valve 470 is for releasing pressure in a second hydraulic actuation line 500. The SCM 410 also comprises a first subsea electronics module (SEM) (not shown) comprising a first central processing unit (CPU), a first input means and a first output means. The first input means is configured to receive an incoming data signal from a sensor typically located on equipment comprised in the subsea architecture. The incoming data is transmitted to the first CPU, and the CPU applies a pre-programmed logic to the incoming data signal. The outgoing data signal is sent to the first output means, which sends the signal to the first dump valve 450.

The SCM 410 is capable of operating the first dump valve 450 positioned within the SCM 410, so that pressures can be released in the first hydraulic actuation line 490 based on the sensed parameters or a command, without the need to send these signals to the surface for processing.

The installation of first and second valves 510, 520 on the equipment of the subsea architecture allows for safe isolation of pressure equipment when required. These valves 510, 520 may be any process valves such as valves of a Christmas tree or subsea manifold. The SCM 410 is provided with supplies of hydraulic fluid from two separate hydraulic lines which manage two different levels of pressure (high pressure for downhole equipment such as emergency shutdown valves and low pressure for subsea equipment such as ASD valves and control valves).

The first dump valve 450, which is for releasing pressure in a first hydraulic actuation line 490, is positioned downstream of a first hydraulic accumulator 530. In the described embodiment the first hydraulic accumulator 530 is positioned within the SCM 410, however it may alternatively be positioned outside the SCM 410. The first dump valve 450 is arranged in data communication with the SEM. The second dump valve 470, which is for releasing pressure in a second hydraulic actuation line 500, is positioned upstream of a second hydraulic accumulator 540. In the described embodiment the second hydraulic accumulator 540 is also positioned within the SCM 410, however it may alternatively be positioned outside the SCM 410. The second dump valve 470 is arranged in data communication with the SEM, wherein the output means is configured to send the outgoing data signal to the second dump valve 470.

A great advantage is provided in the positioning of the first and second hydraulic accumulators 530, 540. The positioning of the first hydraulic accumulator 530 upstream of the first dump valves 450 ensures that high pressure is available to the first hydraulic actuation line 490 to allow for it to be refilled and repressurised quickly after the first dump valve 450 has released the high pressure in the first hydraulic actuation line 490.

The first dump valves 450 are arranged to control valves that require instant loss of hydraulic pressure and fast repressurisation, while the second and fourth dump valves 470, 560 are arranged to control valves that should not lose hydraulic pressure instantly, but instead require a short delay until other valves have been closed to ensure the safety of the system. The delay is achieved by the positioning of the second hydraulic accumulator 540 downstream of the second and fourth dump valves 470, 560.

This configuration ensures that the pressure does not drop instantly at the more safety critical valve 520, which could be an emergency shutdown valve for example, which is controlled by the high pressure hydraulic fluid. When either of the second or fourth dump valves 470, 560 are actuated, the high pressure will be released from within the second hydraulic actuation line 500, downstream of the dump valve 470, 560 and upstream of the second hydraulic accumulator 540. The second hydraulic accumulator 540 will maintain a higher pressure on the downstream side of the second hydraulic accumulator 540 for a short period of time, until the second hydraulic accumulator 540 can no longer be fed with hydraulic fluid as the pressure upstream of the second hydraulic accumulator 540 has been exhausted by the dump valve 470, 560. Eventually, the pressure downstream of the second hydraulic accumulator 540 will also drop, however this delay before the safety critical valve sees a change in hydraulic pressure allows for a period of time for other valves to be closed, which are necessary before the safety critical valves are closed by the drop in hydraulic pressure.

A directional control valve 620b is positioned downstream of the high pressure shutdown node 480 and second hydraulic accumulator 540. This directional control valve 620b is within, and is part of, the subsea control module 410 and connects to the second valve 620 by the second hydraulic actuation line 500. The described embodiment may further include a second SEM, comprising a second CPU, a second input means and a second output means. Similarly to the components of the first SEM, the second input means is configured to receive the incoming data signal from at least one sensor and transmit the incoming data signal to the second CPU. The second CPU is configured to receive the incoming data signal from the at least one sensor, apply pre-programmed logic to the incoming data signal and send an outgoing data signal to the second output means. The second output means is configured to receive the outgoing data signal from the second CPU and send the outgoing data signal to the first dump valve or the second dump valve.

As shown in the described embodiment of FIG. 3, the SCM 410 may further comprise a third dump valve 550, configured in series with the first dump valve 450 and in fluid communication with the first hydraulic actuation line 490 and in data communication with the first output means and second output means, to provide redundancy for the first dump valve 450.

The provision of redundancy in the arrangement of the dump valves 450, 550 allows for SIL3 certification according to IEC 61511, which requires two element redundancy, or hardware fault tolerance=1.

Similarly, the SCM 410 may further comprise a fourth dump valve 560, configured in series with the second dump valve 470 and in fluid communication with the second hydraulic actuation line 500 and in data communication with the first output means and second output means, to provide redundancy for the second dump valve 470.

The first and third dump valves 450, 550 are arranged in series, and the second and fourth dump valves 470, 560 are arranged in series. Each set of dump valves has each dump valve 450, 550, 470, 560 positioned in series as opposed to parallel because, if they were in parallel, a stuck open valve would prevent discharging of the fluid. It is sufficient, using the series arrangement, that one valve is operated to discharge the pressurised fluid.

In the described embodiment, each of the dump valves 450, 550, 470, 560 is configured to release pressure downstream 570 upon command to move to a release position, and allow flow from upstream 580 to downstream 570 upon a command to move to a refill position.

The described invention is used in combination with fail-closed safety valves on equipment of the subsea architecture or downhole—such as Christmas tree valves or emergency shut down valves downhole. When pressure is released, the fail-closed safety valves on the equipment trip to a fail closed position. When the dump valves are in the refill position the fail-closed safety valves on the equipment can be operated into open or closed positions.

As shown in FIG. 3, the SCS may be configured to provide hydraulic functions with a safety loop where required, for example in the incorporation of a high integrity pressure protection system (HIPPS). This is provided by at least one additional dump valve 590 positioned on the low pressure hydraulic line 430, preferably downstream of the low pressure shutdown node 460, and provided with an additional hydraulic actuation line 600 to a hydraulically actuated valve 610, the additional dump valve 590 is configured to be operated either by internal logic processing in the SCM 410, or by a signal sent from the surface to the SCM 410 without the SCM 410 applying logic to the signal, the additional dump valve 590 being configured to release pressure downstream when commanded into a release position, and to refill the additional hydraulic actuation line 600 when commanded into a refill position.

The SCS shown in FIG. 3 also comprises a directional control valve 620 positioned on the low pressure hydraulic line 430, preferably downstream of the low pressure shutdown node 460, and provided with a further hydraulic actuation line 630 fluidly connecting the directional control valve 620 to an additional control valve 640 to be operated, wherein the directional control valve 620 is configured to be operated to move from a first position to a second position, or a second position to a first position, by a command from the SCM 410. The first position allows fluid communication between the low pressure hydraulic line 430 and the hydraulic actuation line 630, to allow for refilling of the hydraulic actuation line 630 after it has been depressurised. Hydraulic functions of the system that are not safety certified are built using one or more directional control valves 620 as described, which are bi-stable latched valves to reduce power consumption (as in traditional subsea control modules).

The described SCS provides a reliable and robust system which can provide for an automated response to particular sensed parameters from the sensors on the subsea and downhole equipment. The CPU is able to process the sensed parameters and apply the pre-programmed logic to determine if the dump valves or directional control valve should be activated. The SCS can perform this function without any intervention from the surface. The use of hydraulic actuation lines 600, 630 between the additional dump valve 590 and the hydraulically actuated valve 610, and between the directional control valve 620 and the additional control valve 640, allows for only a short length of hydraulic line to be depressurised when required, and then refilled and repressurised quickly when required.

The additional dump valve 590 and directional control valve 620 are shown in FIG. 3 within and out with the SCM 410 respectively, however it will be appreciated that each of these additional features may be positioned within the SCM 410, or out with the SCM 410 as part of the greater SCS.

The second and fourth dump valves 470, 560 used in combination with the second redundant SEM with certified electronic and the certified communication with topside or local process pressure detection, allow for SIL 3 certified safety critical valve shutdown. The described arrangement provides SIL 3 certification.

The system described with reference to FIG. 3 provides a robust system which can operate both safety critical and non-safety critical valves autonomously and by communication from the surface, and provides for instantaneous activation of valves and delayed activation of valves where required. Furthermore, the hydraulic accumulator positioned upstream of the dump valves allows for faster repressurising of the depressurised lines, saving a great deal of time.

In the described system, the SEMs are built using safety certified controllers that de-energise the outputs upon failure. To grant SIL3 certification for safety loops such as the HIPPS system, the CPU, input means and output means involved are redundant in each SEM, that is to say they are replicated with an identical backup CPU, input means and output means.

The described system in FIG. 3 overcomes the need for a node located on topside facilities, for example on the vessel 400. This node would have a supervisory control function, however this is no longer required as the SCM 410 itself is capable of reacting autonomously and safely to emergencies.

A safety loop, such as HIPPS, can be safety rated SIL3 by using four pressure sensors (arranged in 2oo4 configuration) connected to the redundant input means of each SEM, and two dump valves that depressurise lines connected to Christmas tree valves, wherein the dump valves being connected to the redundant output means. When high pressure is measured by 2oo4 sensors the dump valves are de-energised, causing the closure of the Christmas tree valves.

To guarantee that the system safely reacts upon a command generated by a topside alarm, the communication is redundant and is SIL3 certified. To maximize availability of the system with respect to single component failures, the power electronics are dual redundant in each SEM.

Figure 4:
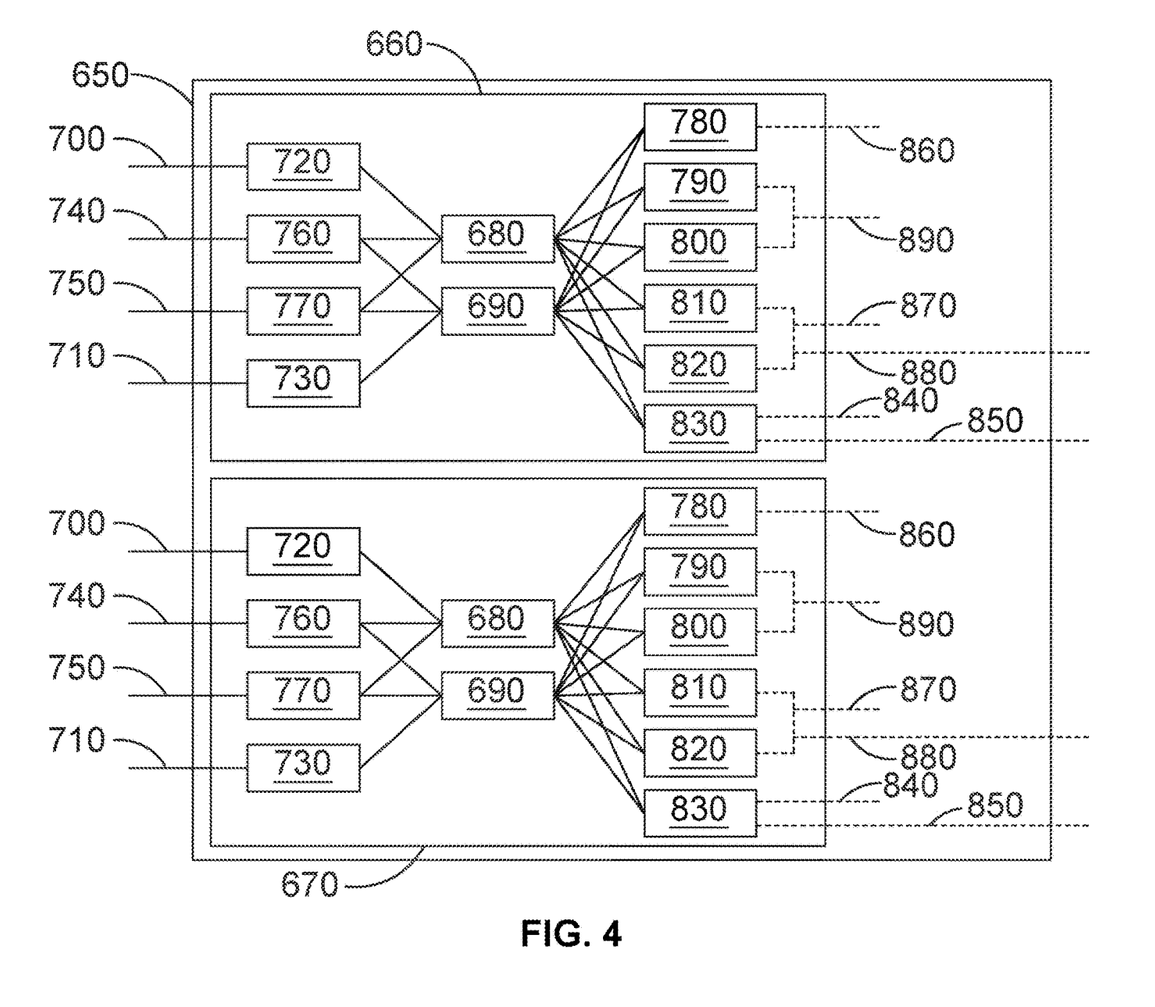
FIG. 4 shows a subsea control module in accordance with an aspect of the present invention.

Referring now to FIG. 4, which shows an SCM 650 in accordance with an aspect of the present invention. The SCM 650 is capable of providing SIL 3 compliance with autonomous safety functioning without a command from the surface. Additionally, it is capable of operating additional directional control valves from via surface command, and integrating a safety loop system (such as HIPPS) into the SCS.

In a preferred embodiment the SCM is SIL3 certified according to IEC 61508 and IEC 61511 as well as its input means, output means, and CPU.

The SCM 650 comprises two SEMs 660, 670 for redundancy, as described above. Each SEM 660, 670 is identical and comprises a first CPU 680 and a second CPU 690. The CPUs 680, 690 can receive data communications from the surface via communications lines 700, 710. The data is firstly sent to a modem 720, 730 before being sent to each CPU 680, 690. Each SEM 660, 670 is also connected via two power lines 740, 750 to a power supply at the surface. The use of two power lines 740, 750 is for redundancy. These power lines 740, 750 provide power for the power electronics 760, 770 in each SEM 660, 670. Each CPU 680, 690 is connected to three or more outputs 780, 790, 800 and three or more inputs 810, 820, 830. The first input 830 receives signals 840, 850 from sensors located on subsea equipment. Each signal 840, 850 is passed from the input 830 to each CPU 680, 690. The CPU then applies pre-programmed logic to the signal and sends an output signal to the first output 780. This output signal 860 is passed to the correct component of the subsea architecture, such as a solenoid or hydraulic actuator for activation of a valve for example. This allows non-safety critical valves to be activated based on non-safety critical sensor readings, and the data processed autonomously by the SCM 650.

For safety critical valves and sensors, the system must be SIL 3 compliant. Each signal 870, 880 from a safety critical sensor is fed into two input means 810, 820 (for redundancy). Each input means 810, 820 passes the signal to both CPUs 680, 690 which apply pre-programmed logic to the signal, and send an output signal to each output means 790, 880. Each output means 790, 800 then sends the output signal 890 to dump valves which operate the safety related valves or solenoids to be activated.

It is also possible for the CPUs 680, 690 to receive signals from the communication lines 700, 710 from the surface, with commands to directly operate valves such as directional control valves. The CPUs 680, 690 can directly pass the command to the output 780 to operate valves or solenoids.

The integration of feedback from sensors to operate valves and solenoids, and also the direct control of directional control valves from commands from the surface, effectively integrates safety loops and direct commands from the surface into the operation of the SCM 650, such that it can serve as one module which can operate different safety level systems, i.e. SIL 3 certified systems as well as simultaneously operating less safety critical systems.

Figure 5:
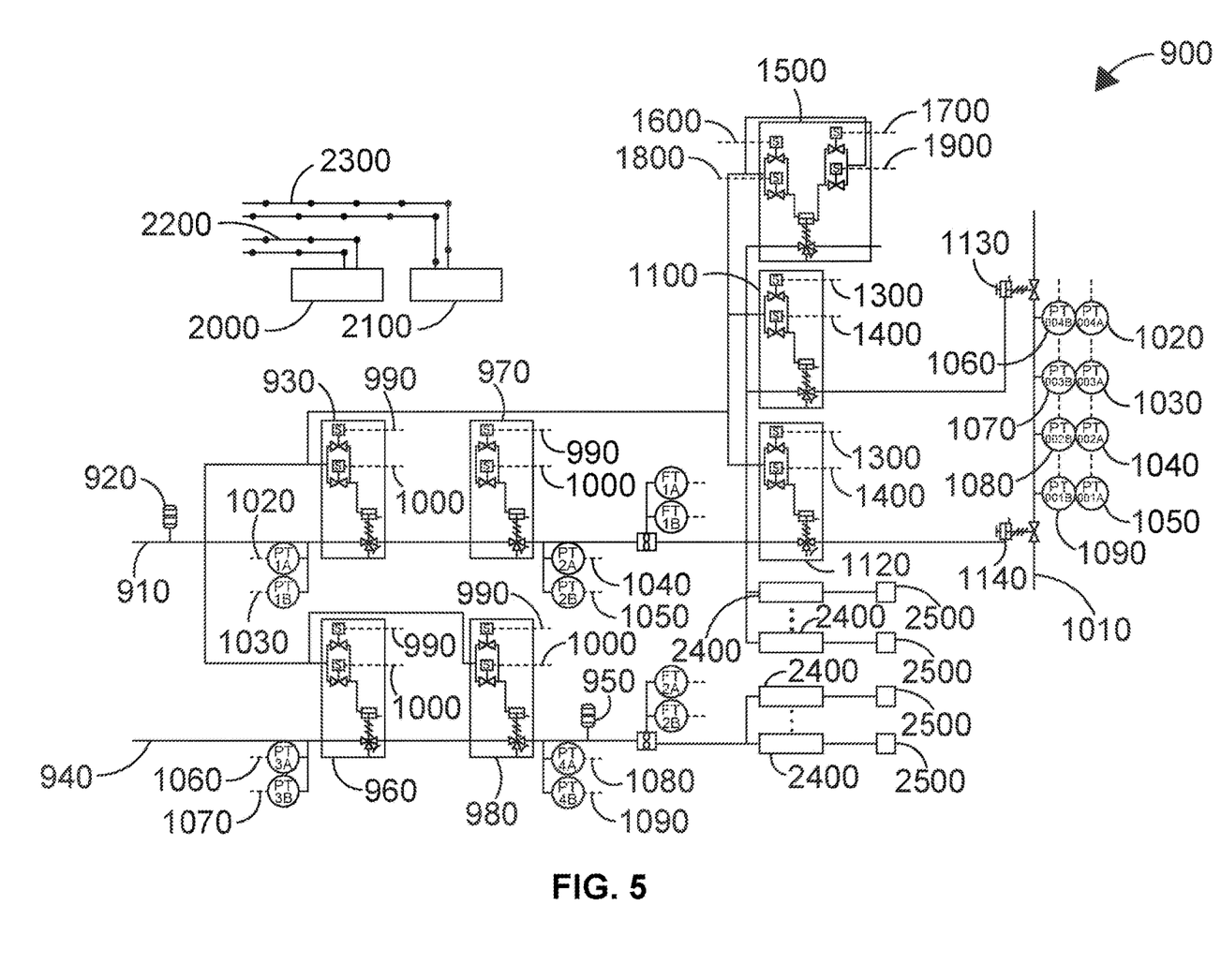
FIG. 5 shows a hydraulic diagram of a subsea control system in accordance with an aspect of the present invention.

Referring now to FIG. 5, which shows a hydraulic diagram of an SCS in accordance with an aspect of the present invention. Similarly to the embodiment described with reference to FIG. 4, the SCS provides SIL 3 compliance for safety related functions together with safety loop integration and direct control of additional non-safety related valves such as standard directional control valves. A low pressure hydraulic line 910 is provided with a first hydraulic accumulator 920 positioned upstream of a first dump valve 930. A high pressure hydraulic line 940 is provided with a second hydraulic accumulator 950 positioned downstream of a second dump valve 960. A third dump valve 970 is provided for redundancy for the first dump valve 930, and a fourth dump valve 980 is provided for redundancy for the second dump valve 960. Each of the dump valves 930, 970, 960, 980 receives a first signal 990 from a first SEM of an SCM, and a second signal 1000 from a second SEM of the SCM, when that dump valve is to be operated.

A variety of sensors are placed at the critical equipment, such as the Christmas tree. FIG. 5 shows the sensors on the flow line from the well 1010. Each pressure sensor (PT 00XA 1020, 1030, 1040, 1050) has a corresponding second pressure sensor for redundancy (PT 00XB 1060, 1070, 1080, 1090). The signals from each of the sensors are sent to each of the SEMs, where the signals are processed and appropriate output signals are determined. There are also a similar pressure sensors 1020 (and redundant pressure sensor 1030) on the low pressure hydraulic line 910, before the first dump valve 930, and pressure sensors 1040 (and redundant pressure sensor 1050) after the third dump valve 970. On the high pressure hydraulic line 940, a pressure sensor 1060 (and redundant pressure sensor 1070) is positioned before the second dump valve 960, and a pressure sensor 1080 (and redundant pressure sensor 1090) after the fourth dump valve 980. These pressure sensors also feed data to the SEMs within the SCM, so that the SEMs can process the data through the application of pre-programmed logic to make decisions regards which dump valves to operate.

In addition to the SIL3 safety system described above, the system 900 further comprises the ability to safety operate HIPPS functions using the control logic within the SEMs of the SCM. First and second additional dump valves 1110, 1120 are incorporated in the system and connect lines from the low pressure hydraulic line 910 to hydraulic HIPPS actuators 1130, 1140. Only a low pressure hydraulic line is required for the HIPPS system integration, as the high pressure hydraulic line is only required for operation of downhole valves such as the emergency shut down valve, for example. The SEMs of the SCM receive data from the sensors, apply pre-programmed logic and send an output signal to activate the dump valves 1100, 1200 accordingly. The first additional dump valve 1100 receives a first signal from the first SEM and a second signal from the second SEM, when the first additional dump valve 1100 is required to be activated. In case of malfunction, the redundancy will allow just one command to be transmitted from either SEM to the first additional dump valve 110 to operate it. Similarly, through a third signal 1300 and fourth signal 1400, the second additional dump valve 1120 can be operated when required.

Additionally, the system 900 comprises a directional control valve 1500. The directional control valve 1500 receives commands from either of the SEMs in the SCM. Signals 1600, 1700 are sent to the directional control valve 1500 from the first SEM, and signals 1800, 1900 are sent to the directional control valve from the second SEM. A command from the surface to operate the directional control valve 1500 can be received by the SCM and transmitted to the directional control valve 1500.

Each of the first SEM 2000, and the second SEM 2100 may, in addition to processing the data and operating the dump valves associated with each valve to be controlled, also send each of their respective commands 2200, 2300 sent to the dump valves to the surface for monitoring by personnel. This allows the SCM to perform autonomously but feedback, if required, the commands it has instructed.

Additionally, as shown in FIG. 5 the system may have a series of optional other functions 2400 which control hydraulic actuators 2500 where required.

Figure 6:
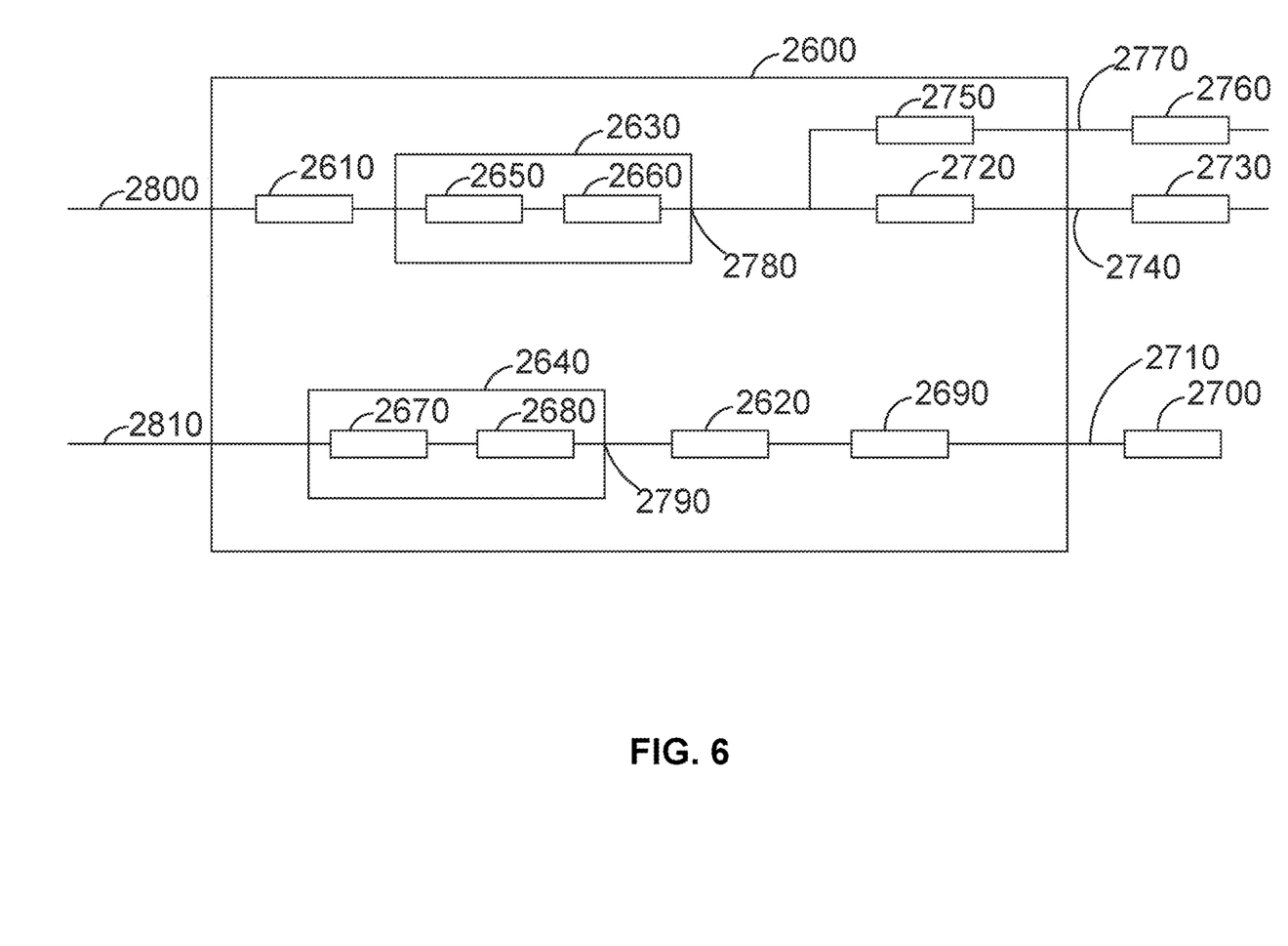
FIG. 6 shows a subsea control module with hydraulic accumulators and additional dump valves located inside the subsea control module.

Referring now to FIG. 6, which shows an alternative embodiment of the present invention. There is shown in FIG. 6 a subsea control module 2600, which is similar to the subsea control module 410 described with reference to FIG. 3, and is for use in a subsea control system as previously described. The subsea control module 2600 has a first hydraulic accumulator 2610 and second hydraulic accumulator 2620 within the subsea control module 2600. Similarly to the subsea control module 410, the subsea control module 2600 comprises a low pressure shutdown node 2630 and a high pressure shutdown node 2640. Each of these nodes comprises two dump valves 2650, 2660 and 2670, 2680, to provide redundancy, as previously discussed in relation to FIG. 3. The present subsea control module 2600 also comprises a directional control valve 2690 positioned downstream of the high pressure shutdown node 2640 and second hydraulic accumulator 2620. This directional control valve 2690 is within, and is part of, the subsea control module 2600, and can be fluidly connected to a process valve 2700 by a first hydraulic actuation line 2710. Also within the subsea control module 2600, and downstream of the low pressure shutdown node 2630, there is a second directional control valve 2720 which can be fluidly connected to a second process valve 2730 by a second hydraulic actuation line 2740. There is also an additional dump valve 2750 positioned within the subsea control module 2600 and downstream of the low pressure shutdown node 2630. The additional dump valve 2750 can be fluidly connected to a third process valve 2760 by a third hydraulic actuation line 2770. As in previous embodiments, it will be understood that the downstream side of the low pressure shutdown node 2630 is at point 2780, and the downstream side of the high pressure shutdown node 2640 is at point 2790. Similarly to in previous embodiments, the subsea control module 2600 is configured to allow the connection to low pressure 2800 and high pressure 2810 hydraulic lines from the surface.

The integration of feedback from sensors to operate valves, and also the direct control of directional control valves from commands from the surface, effectively integrates safety loops and direct commands from the surface into the operation of the SCM, such that it can serve as one module which can operate different safety level systems, i.e. SIL 3 certified systems as well as simultaneously operating less safety critical systems.

It is a further object of the present invention a method relating to a Subsea Control Module (SCM) capable of interfacing a plurality of subsea instruments and controlling a multitude of subsea equipment provided with hydraulic actuators. The method of the invention provides the capability of performing process tasks, closed loop controls and safety tasks at the same time, independently of equipment located above the surface of the sea. In particular, interaction with topside may be limited to power supply and to exchange telemetry data or operator requests; loss of communication does not compromise the capacity of the system to perform control and safety tasks. This is achieved through a IEC 61508/IEC 61511 SIL3 compliant architecture. This new architecture of the system allows for communication of such subsea control module units between each other effectively providing a subsea independent and distributed control system.

Hence, it is an object of the present invention a method for controlling a subsea equipment comprising the following steps:
 arranging a subsea control module according to any of the described embodiments;
 acquiring at least one data signal from at least one sensor connected to a subsea equipment;
 routing the acquired at least one data signal to the subsea control module;
 applying pre-programed logic to the incoming at least one data signal by means of the subsea electronics module of subsea control module;
 providing output data signals to control subsea equipment based exclusively on said pre-programmed logic;
 actuating the subsea equipment on the basis of the output data signals provided by the subsea control module.

The method of the present invention may further comprise the capability of autonomously reacting in case of safety critical scenarios, acquiring data from at least one sensor connected to subsea equipment, identifying a safety critical scenario, apply a pre-programmed logic dictated from the safety critical scenario and autonomously generate at least one output signal to execute commands on the subsea equipment to ensure that safety tasks are performed to manager safety critical scenario.

The method of controlling a subsea equipment of the present invention may further comprise the steps of:
- identify a safety critical scenario based on the acquired at least one data signal;
- applying pre-programmed logic dictated by the safety critical scenario identified by means of the subsea electronics module of subsea control module;
- autonomously generating output signals, based exclusively on the pre-programmed logic applied, to execute commands on the subsea equipment to ensure that safety tasks are performed to manage the safety critical scenario.

It is noticed that the described chain of actions are performed independently and autonomously from any topside facilities that normally act as evaluation and decision making entities. The loop of acquiring data, elaborate them, decide the tasks to be performed and provide commands to execute actions in conformity to decided strategy are independent actions from topside facilities. The main advantage of such method is that, in case of loss or bad communication between the subsea control module and topside facilities, the subsea control module of the present invention is capable of managing the scenario depicted by the incoming signal or signals and react based on pre-programmed logics integrated in its SEM.

The SIL3 architecture provided by the subsea control module of the invention allows for a safe and reliable method of controlling of emergency scenarios and safety critical scenarios in general. This represents a huge advantage against traditional systems in which, in a safety or emergency scenario, each decision and subsequent action is processed through topside facilities in connection with the subsea modules and equipment; it is, hence, self-evident that any disruption of the communication between topside facilities and subsea environment hugely impairs the effectiveness of subsea equipment management.

The invention claimed is:

1. A method for controlling a subsea equipment comprising the steps of:
    arranging a subsea control module (SCM);
    acquiring at least one data signal from at least one sensor connected to the subsea equipment;
    routing the acquired at least one data signal to the SCM;
    applying pre-programed logic to the incoming at least one data signal by means of a subsea electronics module of the SCM;
    providing output data signals to control subsea equipment based exclusively on the pre-programmed logic;
    actuating the subsea equipment with the output data signals provided by the SCM by activating at least one dump valve configured to release pressure in a hydraulic actuation line; and
    wherein the SCM comprises:
    a first subsea electronics module (SEM) comprising a first central processing unit (CPU), a first input modem and a first output modem, wherein the first CPU and the first input modem and the first output modem is SIL3 certified according to IEC 61508 and IEC 61511, wherein the first input modem is configured to receive an incoming data signal from at least one sensor and transmit the incoming data signal to the first CPU;
    wherein the first CPU is configured to receive the incoming data signal from the at least one sensor, apply pre-programmed logic to the incoming data signal and send an outgoing data signal to the first output modem; and the first output modem is configured to receive the outgoing data signal from the first CPU and send the outgoing data signal to at least one dump valve configured to release pressure in a hydraulic actuation line;
    a second subsea electronic module (SEM), that is redundant, the second SEM acting independently from and simultaneously with the first SEM, comprising a second CPU, a second input modem and a second output modem, wherein the second CPU and the second input modem and the second output modem is SIL3 certified according to IEC 61508 and IEC 61511, wherein the second input modem is configured to receive the incoming data signal from the at least one sensor and transmit the incoming data signal to the second CPU;
    wherein the second CPU is configured to receive the incoming data signal from the at least one sensor, apply pre-programmed logic to the incoming data signal and send an outgoing data signal to the second output modem;
    wherein the second output modem is configured to receive the outgoing data signal from the second CPU and send the outgoing data signal to the at least one dump valve to provide data communication redundancy for the at least one dump valve; and
    certified electronics enabling communication from and to the SCM through a SIL3 certified communication protocol according to IEC 61508 and IEC 61511; and
    wherein the SCM is SIL3 certified according to IEC 61508 and IEC 61511.

2. The method according to claim 1 further comprising the steps of:
    identifying a safety critical scenario based on the acquired at least one data signal;
    applying pre-programmed logic dictated by the safety critical scenario identified by means of the subsea electronics module of the SCM;
    autonomously generating output signals, based exclusively on the pre-programmed logic applied, to execute commands on the subsea equipment to ensure that safety tasks are performed to manage the safety critical scenario.

* * * * *